US012610309B2

(12) United States Patent
Määttänen et al.

(10) Patent No.: US 12,610,309 B2
(45) Date of Patent: Apr. 21, 2026

(54) CONNECTION CONTROL FOR NON-TERRESTRIAL NETWORKS

(71) Applicant: TELEFONAKTIEBOLAGET LM ERICSSON (PUBL), Stockholm (SE)

(72) Inventors: Helka-Liina Määttänen, Helsinki (FI); Emre Yavuz, Stockholm (SE); Sebastian Euler, Storvreta (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 522 days.

(21) Appl. No.: 18/009,845

(22) PCT Filed: Jun. 11, 2021

(86) PCT No.: PCT/IB2021/055173
§ 371 (c)(1),
(2) Date: Dec. 12, 2022

(87) PCT Pub. No.: WO2021/250632
PCT Pub. Date: Dec. 16, 2021

(65) Prior Publication Data
US 2023/0262590 A1 Aug. 17, 2023

Related U.S. Application Data

(60) Provisional application No. 63/037,969, filed on Jun. 11, 2020.

(51) Int. Cl.
*H04W 56/00* (2009.01)
*H04W 48/18* (2009.01)
*H04W 84/06* (2009.01)

(52) U.S. Cl.
CPC ....... *H04W 48/18* (2013.01); *H04W 56/0015* (2013.01); *H04W 84/06* (2013.01)

(58) Field of Classification Search
CPC ............ H04B 7/18539; H04B 7/18578; H04B 7/18591; H04W 48/18; H04W 56/0015; H04W 84/06
(Continued)

(56) References Cited

U.S. PATENT DOCUMENTS 10,805,850 B1* 10/2020 Benammar ......... H04W 36/144
12,081,316 B2* 9/2024 Wang ................... H04B 7/1851
(Continued)

FOREIGN PATENT DOCUMENTS

CN 106851752 A 6/2017
CN 111108776 A 5/2020
(Continued)

OTHER PUBLICATIONS

Nay, et al., "Vertical Handoff Decision Algorithm for Integrated UMTS and LEO Satellite Networks," 2009 International Conference on Communications and Mobile Computing, whole document, Jan. 6, 2009.
(Continued)

*Primary Examiner* — Robert J Lopata
(74) *Attorney, Agent, or Firm* — Ericsson Inc.

(57) ABSTRACT

According to some embodiments, a method performed by a wireless device for non-terrestrial network (NTN) connection control comprises receiving a message comprising parameters from which the wireless device is informed that it is to disconnect from a terrestrial network (TN) and connect to one of one or more NTNs or disconnect from a NTN and connect to one of one or more TNs. Upon the parameters informing the wireless device to connect to one of one or more NTNs, the method further comprises: disconnecting from the TN; based at least in part on the one or more parameters, selecting one of the detected at least one of the one or more NTNs; and connecting to the selected
(Continued)

NTN. Upon the parameters informing the wireless device to connect to one of one or more TNs: the method further comprises disconnecting from the NTN, and detecting, selecting, and connecting to the TN.

18 Claims, 11 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 12,213,012 | B2 * | 1/2025 | Wang | H04W 36/322 |
| 2018/0192337 | A1 * | 7/2018 | Ryu | H04W 36/0066 |
| 2018/0323922 | A1 * | 11/2018 | Lindoff | H04L 5/0048 |
| 2019/0159088 | A1 * | 5/2019 | Shi | H04W 36/08 |
| 2019/0253944 | A1 * | 8/2019 | Kim | H04W 36/0072 |
| 2019/0335365 | A1 * | 10/2019 | Ying | H04W 36/0011 |
| 2020/0053601 | A1 * | 2/2020 | Wu | H04W 36/0064 |
| 2021/0099933 | A1 | 4/2021 | Matsuda | |
| 2021/0105685 | A1 * | 4/2021 | Li | H04W 36/0011 |
| 2021/0119861 | A1 * | 4/2021 | Tripathi | H04L 5/0048 |
| 2021/0242935 | A1 * | 8/2021 | Sakhnini | H04B 7/18543 |
| 2021/0250816 | A1 * | 8/2021 | Xu | H04W 36/0016 |
| 2022/0039044 | A1 * | 2/2022 | Wu | H04B 7/18504 |
| 2022/0167216 | A1 * | 5/2022 | Kolekar | H04W 36/08 |
| 2022/0377625 | A1 * | 11/2022 | Li | H04W 36/0058 |
| 2023/0015847 | A1 * | 1/2023 | Li | H04W 36/0072 |
| 2023/0156546 | A1 * | 5/2023 | Bergström | H04W 36/0072 |
| | | | | 370/331 |
| 2023/0276309 | A1 * | 8/2023 | Xu | H04B 7/18508 |
| | | | | 455/428 |

FOREIGN PATENT DOCUMENTS

| | | |
|---|---|---|
| EP | 3432642 A1 | 1/2019 |
| WO | 2019193891 A1 | 10/2019 |

OTHER PUBLICATIONS

Wang, et al., "Network-assisted vertical handover scheme in heterogeneous aeronautical network," 2020 Asia-Pacific Conference on Image Processing, Electronics and Computers (IPEC), pp. 148-152, Apr. 14-16, 2020.

RAN2 Chairman (Mediatek), "Proposed Agenda", 3GPP TSG-RAN WG2 Meeting #107bis, R2-1912000, Oct. 28, 2019, 21 Pages.

* cited by examiner

400

500

512 – obtain one or more parameters associated with an NTN

514 – transmit a message to a wireless device, the message including the one or more parameters that inform the wireless device to disconnect from a terrestrial network (TN) and connect to one of one or more NTNs

710
Host computer provides user data

720
Host computer initiates transmission carrying the user data to the UE

730
UE receives the user data

611
Host computer executes client application

610
Host computer provides user data

620
Host computer initiates transmission carrying the user data to the UE

630
Base station transmits the user data

640
UE executes client application

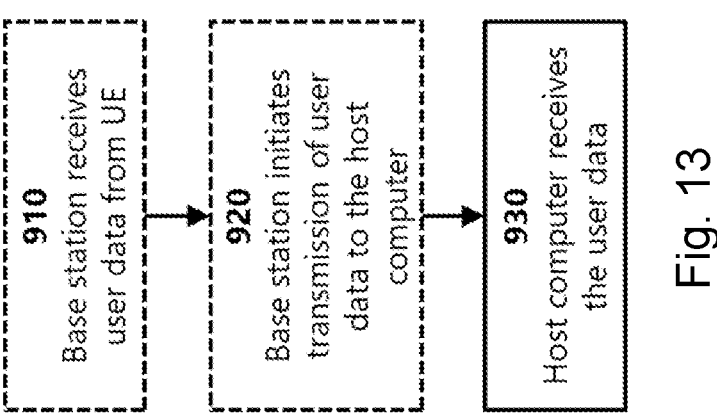

910
Base station receives user data from UE

920
Base station initiates transmission of user data to the host computer

930
Host computer receives the user data

Fig. 13

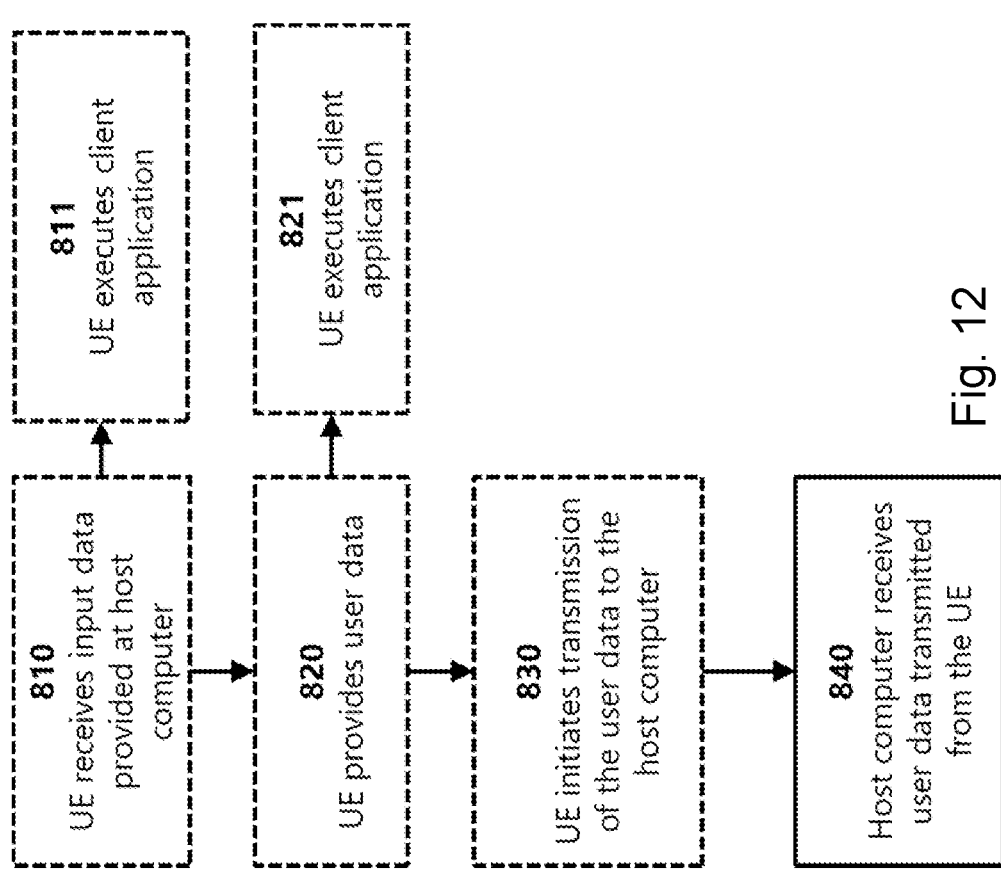

811
UE executes client application

821
UE executes client application

810
UE receives input data provided at host computer

820
UE provides user data

830
UE initiates transmission of the user data to the host computer

840
Host computer receives user data transmitted from the UE

Fig. 12

CONNECTION CONTROL FOR NON-TERRESTRIAL NETWORKS

This application is a 371 of International Application No. PCT/IB2021/055173, filed Jun. 11, 2021, which claims the benefit of U.S. Provisional Application No. 63/037,969, filed Jun. 11, 2020, the disclosure of which is fully incorporated herein by reference.

TECHNICAL FIELD

Embodiments of the present disclosure are directed to wireless communications and, more particularly, to connection control for non-terrestrial networks (NTNs).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Satellite communications are experiencing an ongoing resurgence. Several plans for satellite networks have been announced in the past few years. The target services include, for example, backhaul and fixed wireless, transportation, outdoor mobile, Internet of things (IoT). Satellite networks may complement mobile networks on the ground by providing connectivity to underserved areas and multicast/broadcast services. To benefit from the strong mobile ecosystem and economy of scale, adapting the terrestrial wireless access technologies including long term evolution (LTE) and new radio (NR) for satellite networks is drawing significant interest. For example, Third Generation Partnership Project (3GPP) completed an initial study on adapting NR to support non-terrestrial networks (mainly satellite networks. The initial study focused on the channel model for the non-terrestrial networks, defining deployment scenarios, and identifying the key potential impacts. 3GPP is conducting a follow-up study item on solutions evaluation for NR to support non-terrestrial networks.

A satellite radio access network usually includes the following components: (a) a gateway that connects satellite network to core network; (b) a satellite that refers to a space-borne platform; (c) a terminal that refers to user equipment; (c) a feeder link that refers to the link between a gateway and a satellite; and (d) a service link that refers to the link between a satellite and a terminal. The link from gateway to terminal is often referred to as the forward link, and the link from terminal to gateway is often referred to as the return link.

Depending on the functionality of the satellite in the system, two transponder options exist. One is the bent-pipe transponder, where the satellite forwards the received signal back to the earth with only amplification and a shift from uplink frequency to downlink frequency. The other is the regenerative transponder, where the satellite includes on-board processing to demodulate and decode the received signal and regenerate the signal before sending it back to the earth.

Depending on the orbit altitude, a satellite may be categorized as a low earth orbit (LEO), medium earth orbit (MEO), or geostationary earth orbit (GEO) satellite. LEO includes typical heights ranging from 250-1,500 km, with orbital periods ranging from 90-120 minutes. MEO includes typical heights ranging from 5,000-25,000 km, with orbital periods ranging from 3-15 hours. GEO includes heights at about 35,786 km, with an orbital period of 24 hours.

A satellite typically generates several beams over a given area. The footprint of a beam is usually in an elliptic shape, which has been traditionally considered as a cell. The footprint of a beam is also often referred to as a spotbeam. The footprint of a spotbeam may move over the earth surface with the satellite movement or may be earth fixed where the satellite uses a beam pointing mechanism to compensate for its motion. The size of a spotbeam depends on the system design, which may range from tens of kilometers to a few thousands of kilometers.

FIG. 1 is a block diagram illustrating an example satellite network architecture with bent pipe transponders. FIG. 1 includes three satellites connected to a base station via three feeder links and three antennas. A user equipment in one of the spot beams is connected to one of the satellites via the access link.

Two main physical phenomena that affect satellite communications system design are the long propagation delay and Doppler effects. The Doppler effects are especially pronounced for LEO satellites.

Current activity regarding NTN includes control plane enhancements. The enhancements include idle mode and connected mode enhancements.

For idle mode, enhancements include definition of additional assistance information for cell selection/reselection (e.g., using user equipment (UE) location information, satellite ephemeris information, etc.), and definition of NTN (satellite/high-altitude platform station (HAPS)) cell specific information in the system information base (SIB).

For connected mode, enhancements include using location information (UE and Satellite/HAPS) and/or ephemeris for determining when to perform hand-over to have a high degree of hand-over control for hand-over robustness and coverage management. Also included are enhancements to the existing measurement configurations to address absolute propagation delay difference between satellites (e.g., synchronization signal block (SSB) measurement timing configuration (SMTC) measurement gap adaptation to the SSB/channel state information reference signal (CSI-RS) measurement window).

Connection control in NR uses radio resource control (RRC) messages. The RRC release message is used for multiple purposes like when a UE is suspended to idle/inactive state or when the RRC connection is released and the UE is set to RRC idle mode. In the latter case, the UE may be given redirection information in the release message that advises the UE on cell selection.

The RRCRelease message is used to command the release of an RRC connection or the suspension of the RRC connection.

Signalling radio bearer: SRB1

RLC-SAP: AM

Logical channel. DCCH

Direction: Network to UE

RRCRelease Message

```
-- ASN1START
-- TAG-RRCRELEASE-START
RRCRelease ::=                          SEQUENCE {
    rrc-TransactionIdentifier               RRC-TransactionIdentifier,
    criticalExtensions                      CHOICE {
        rrcRelease                              RRCRelease-IEs,
        criticalExtensionsFuture                SEQUENCE { }
    }
}
RRCRelease-IEs ::=                      SEQUENCE {
    redirectedCarrierInfo                       RedirectedCarrierInfo
OPTIONAL,   -- Need N
    cellReselectionPriorities                   CellReselectionPriorities
OPTIONAL,   -- Need R
    suspendConfig                           SuspendConfig
OPTIONAL,   -- Need R
    deprioritisationReq                     SEQUENCE {
        deprioritisationType                    ENUMERATED {frequency, nr},
        deprioritisationTimer                   ENUMERATED {min5, min10, min15,
min30}
    }
OPTIONAL,   -- Need N
    lateNonCriticalExtension                OCTET STRING
OPTIONAL,
    nonCriticalExtension                    RRCRelease-v1540-IEs
OPTIONAL
}
RRCRelease-v1540-IEs ::=                SEQUENCE {
    waitTime                                RejectWaitTime
OPTIONAL, -- Need N
    nonCriticalExtension                    RRCRelease-v16xy-IEs
OPTIONAL
}
RRCRelease-v16xy-IEs ::=                SEQUENCE {
    voiceFallbackIndication-r16             ENUMERATED {true}
OPTIONAL, -- Need N
    measIdleConfig-r16                      SetupRelease
{MeasIdleConfigDedicated-r16}       OPTIONAL, -- Need M
    nonCriticalExtension                    SEQUENCE { }
OPTIONAL
}
RedirectedCarrierInfo ::=               CHOICE {
    nr                                          CarrierInfoNR,
    eutra                                       RedirectedCarrierInfo-EUTRA,
    ...
}
RedirectedCarrierInfo-EUTRA ::=         SEQUENCE {
    eutraFrequency                              ARFCN-ValueEUTRA,
    cnType                                      ENUMERATED {epc, fiveGC}
OPTIONAL   -- Need N
}
CarrierInfoNR ::=                       SEQUENCE {
    carrierFreq                                 ARFCN-ValueNR,
    ssbSubcarrierSpacing                        SubcarrierSpacing,
    smtc                                        SSB-MTC
OPTIONAL,   -- Need S
    ...
}
SuspendConfig ::=                       SEQUENCE {
    fullI-RNTI                                  I-RNTI-Value,
    shortI-RNTI                                 ShortI-RNTI-Value,
    ran-PagingCycle                             PagingCycle,
    ran-NotificationAreaInfo                    RAN-NotificationAreaInfo
OPTIONAL,   -- Need M
    t380                                        PeriodicRNAU-TimerValue
OPTIONAL,   -- Need R
    nextHopChainingCount                        NextHopChainingCount,
    ...
}
PeriodicRNAU-TimerValue ::=             ENUMERATED { min5, min10, min20, min30,
min60, min120, min360, min720}
CellReselectionPriorities ::=           SEQUENCE {
    freqPriorityListEUTRA                       FreqPriorityListEUTRA
OPTIONAL,   -- Need M
    freqPriorityListNR                          FreqPriorityListNR
```

-continued

```
OPTIONAL,    -- Need M
    t320                                 ENUMERATED {min5, min10, min20,
min30, min60, min120, min180, spare1)    OPTIONAL,    -- Need R
    ...
}
PagingCycle ::=                          ENUMERATED {rf32, rf64, rf128, rf256}
FreqPriorityListEUTRA ::=                SEQUENCE (SIZE (1..maxFreq)) OF
FreqPriorityEUTRA
FreqPriorityListNR ::=                   SEQUENCE (SIZE (1..maxFreq)) OF
FreqPriorityNR
FreqPriorityEUTRA ::=                    SEQUENCE {
    carrierFreq                              ARFCN-ValueEUTRA,
    cellReselectionPriority                  CellReselectionPriority,
    cellReselectionSubPriority               CellReselectionSubPriority
OPTIONAL   -- Need R
}
FreqPriorityNR ::=                       SEQUENCE {
    carrierFreq                              ARFCN-ValueNR,
    cellReselectionPriority                  CellReselectionPriority,
    cellReselectionSubPriority               CellReselectionSubPriority
OPTIONAL   -- Need R
}
RAN-NotificationAreaInfo ::=             CHOICE {
    cellList                                 PLMN-RAN-AreaCellList,
    ran-AreaConfigList                       PLMN-RAN-AreaConfigList,
    ...
}
PLMN-RAN-AreaCellList ::=                SEQUENCE (SIZE (1.. maxPLMNIdentities))
OF PLMN-RAN-AreaCell
PLMN-RAN-AreaCell ::=                    SEQUENCE {
    plmn-Identity                            PLMN-Identity
OPTIONAL,   -- Need S
    ran-AreaCells                            SEQUENCE (SIZE (1..32)) OF
CellIdentity
}
PLMN-RAN-AreaConfigList ::=              SEQUENCE (SIZE (1..maxPLMNIdentities))
OF PLMN-RAN-AreaConfig
PLMN-RAN-AreaConfig ::=                  SEQUENCE {
    plmn-Identity                            PLMN-Identity
OPTIONAL,   -- Need S
    ran-Area                                 SEQUENCE (SIZE (1..16)) OF RAN-
AreaConfig
}
RAN-AreaConfig ::=                       SEQUENCE {
    trackingAreaCode                     TrackingAreaCode,
    ran-AreaCodeList                     SEQUENCE (SIZE (1..32)) OF RAN-AreaCode
OPTIONAL   -- Need R
}
-- TAG-RRCRELEASE-STOP
-- ASN1STOP
```

| RRCRelease-IEs field descriptions |
| --- |
| cnType |
| Indicate that the UE is redirected to EPC or 5GC. |
| deprioritisationReq |
| Indicates whether the current frequency or RAT |
| is to be de-prioritised. |
| deprioritisationTimer |
| Indicates the period for which either the current |
| carrier frequency or NR is deprioritised. |
| Value minN corresponds to N minutes. |
| measIdleConfig |
| Indicates measurement configuration to be stored |
| and used by the UE while in RRC_IDLE or |
| RRC_INACTIVE. |
| suspendConfig |
| Indicates configuration for the RRC_INACTIVE state. |
| The network does not configure suspendConfig when the |
| network redirect the UE to an inter-RAT carrier frequency. |
| redirectedCarrierInfo |
| Indicates a carrier frequency (downlink for FDD) and is |
| used to redirect the UE to an NR or an inter-RAT carrier |
| frequency, by means of cell selection at transition to |
| RRC_IDLE or RRC_INACTIVE as specified in TS 38.304. In |
| this release of specification, redirectedCarrierInfo is |

-continued

| RRCRelease-IEs field descriptions |
| --- |
| not included in an RRCRelease message with suspendConfig |
| if this message is in response to an RRCResumeRequest or |
| an RRCResumeRequest1 which is triggered by the NAS layer. |
| voiceFallbackIndication |
| Indicates the RRC release is triggered by EPS fallback |
| for IMS voice as specified in TS 23.502. |

| CarrierInfoNR field descriptions |
| --- |
| carrierFreq |
| Indicates the redirected NR frequency. |
| ssbSubcarrierSpacing |
| Subcarrier spacing of SSB in the redirected SSB frequency. |
| Only the values 15 kHz or 30 kHz (FR1), and 120 kHz or |
| 240 kHz (FR2) are applicable. |
| smtc |
| The SSB periodicity/offset/duration configuration for the |
| redirected SSB frequency. It is based on timing reference |
| of PCell. If the field is absent, the UE uses the SMTC |

-continued

| CarrierInfoNR field descriptions |
| --- |
| configured in the measObjectNR having the same SSB frequency and subcarrier spacing. |

| RAN-NotificationAreaInfo field descriptions |
| --- |
| cellList<br>A list of cells configured as RAN area.<br>ran-AreaConfigList<br>A list of RAN area codes or RA code(s) as RAN area. |

| PLMN-RAN-AreaConfig field descriptions |
| --- |
| plmn-Identity<br>PLMN Identity to which the cells in ran-Area belong. If the field is absent the UE uses the ID of the registered PLMN.<br>ran-AreaCodeList<br>The total number of RAN-AreaCodes of all PLMNs does not exceed 32.<br>ran-Area<br>Indicates whether TA code(s) or RAN area code(s) are used for the RAN notification area. The network uses only TA code(s) or RAN area code(s) to configure a UE. The total number of TACs across all PLMNs does not exceed 16. |

| PLMN-RAN-AreaCell field descriptions |
| --- |
| plmn-Identity<br>PLMN Identity to which the cells in ran-AreaCells belong. If the field is absent the UE uses the ID of the registered PLMN.<br>ran-AreaCells<br>The total number of cells of all PLMNs does not exceed 32. |

| SuspendConfig field descriptions |
| --- |
| ran-NotificationAreaInfo<br>Network ensures that the UE in RRC_INACTIVE always has a valid ran-NotificationAreaInfo.<br>ran-PagingCycle<br>Refers to the UE specific cycle for RAN-initiated paging. Value rf32 corresponds to 32 radio frames, value rf64 corresponds to 64 radio frames and so on.<br>t380<br>Refers to the timer that triggers the periodic RNAU procedure in UE. Value min5 corresponds to 5 minutes, value min10 corresponds to 10 minutes and so on. |

There currently exist certain challenge(s). For example, the current release and redirect message and framework are for terrestrial networks only and do account for NTN networks or the service continuity scenario between a terrestrial network (TN) and a NTN.

SUMMARY

Based on the description above, certain challenges currently exist with connection control for non-terrestrial networks (NTNs). Certain aspects of the present disclosure and their embodiments may provide solutions to these or other challenges.

Particular embodiments facilitate movement of a user equipment (UE) between carrier frequencies or networks involving NTN, in particular moving a UE from a terrestrial network (TN) to a NTN using RRCRelease with redirection. In some embodiments, new information is included in the RRCRelease message that informs the UE of the type of network it is redirected to and/or provides the UE with information that facilitates UE access to the network or carrier frequency it is redirected to, where in particular such information may indicate properties specific to NTNs. As another example, certain embodiments may include ways of deprioritizing carrier frequencies or networks, e.g., using extensions of the deprioritisationReq information element (IE) in the RRCRelease message.

According to some embodiments, a method performed by a wireless device for NTN connection control comprises receiving a message comprising one or more parameters from which the wireless device is informed that the wireless device is to disconnect from a TN and connect to one of one or more NTNs or disconnect from a NTN and connect to one of one or more TNs. Upon the one or more parameters informing the wireless device to connect to one of one or more NTNs, the method further comprises: disconnecting from the TN; detecting at least one of the one or more NTNs; based at least in part on the one or more parameters, selecting one of the detected at least one of the one or more NTNs; synchronizing with the selected NTN using at least one of the one or more parameters to facilitate the synchronization; and connecting to the selected NTN. Upon the one or more parameters informing the wireless device to connect to one of one or more TNs, the method further comprises disconnecting from the NTN; detecting at least one of the one or more TNs; based at least in part on the one or more parameters, selecting one of the detected at least one of the one or more TNs; synchronizing with the selected TN using at least one of the one or more parameters to facilitate the synchronization; and connecting to the selected TN.

In particular embodiments, the message is an RRCRelease message. The one or more parameters may comprise a carrier frequency of the NTN, a radio access technology (RAT) type associated with the NTN, and/or one or more of synchronization signal block measurement timing configuration (SMTC), subcarrier spacing, core network type, cell identifier, and type of NTN (e.g., low, medium, or high earth orbit, etc.).

In particular embodiments, the one or more parameters are part of RedirectedCarrierInfo information element and/or CarrierInfoNR information element.

In particular embodiments, the one or more parameters comprise information to facilitate the wireless device finding and/or connecting with a satellite associated with the NTN (e.g., ephemeris data).

In particular embodiments, the one or more parameters comprise prioritization information associated with the NTN. The prioritization information may comprise an offset to apply to one or more cell quality values and/or a deprioritisationType. The prioritization information may comprise a list. The prioritization information may be associated with a cell different than the current cell.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node for non-terrestrial network (NTN) connection control comprises obtaining one or more parameters associated with an NTN and transmitting a message to a wireless device. The message includes the one or more parameters that inform the wireless device to disconnect from a terrestrial network (TN) and connect to one of one or more NTNs.

In particular embodiments, the message and the one or more parameters are the same as those described with respect to the wireless device embodiments.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments ensure that a UE knows if it is redirected to a TN or NTN, and provides information about the NTN to which the UE is redirected.

BRIEF DESCRIPTION OF THE DRAWINGS

For a more complete understanding of the disclosed embodiments and their features and advantages, reference is now made to the following description, taken in conjunction with the accompanying drawings, in which:

FIG. 12 is a flowchart illustrating a method implemented in a communication system, according to certain embodiments; and FIG. 13 is a flowchart illustrating a method implemented in a communication system, according to certain embodiments.

DETAILED DESCRIPTION

Figure 1:
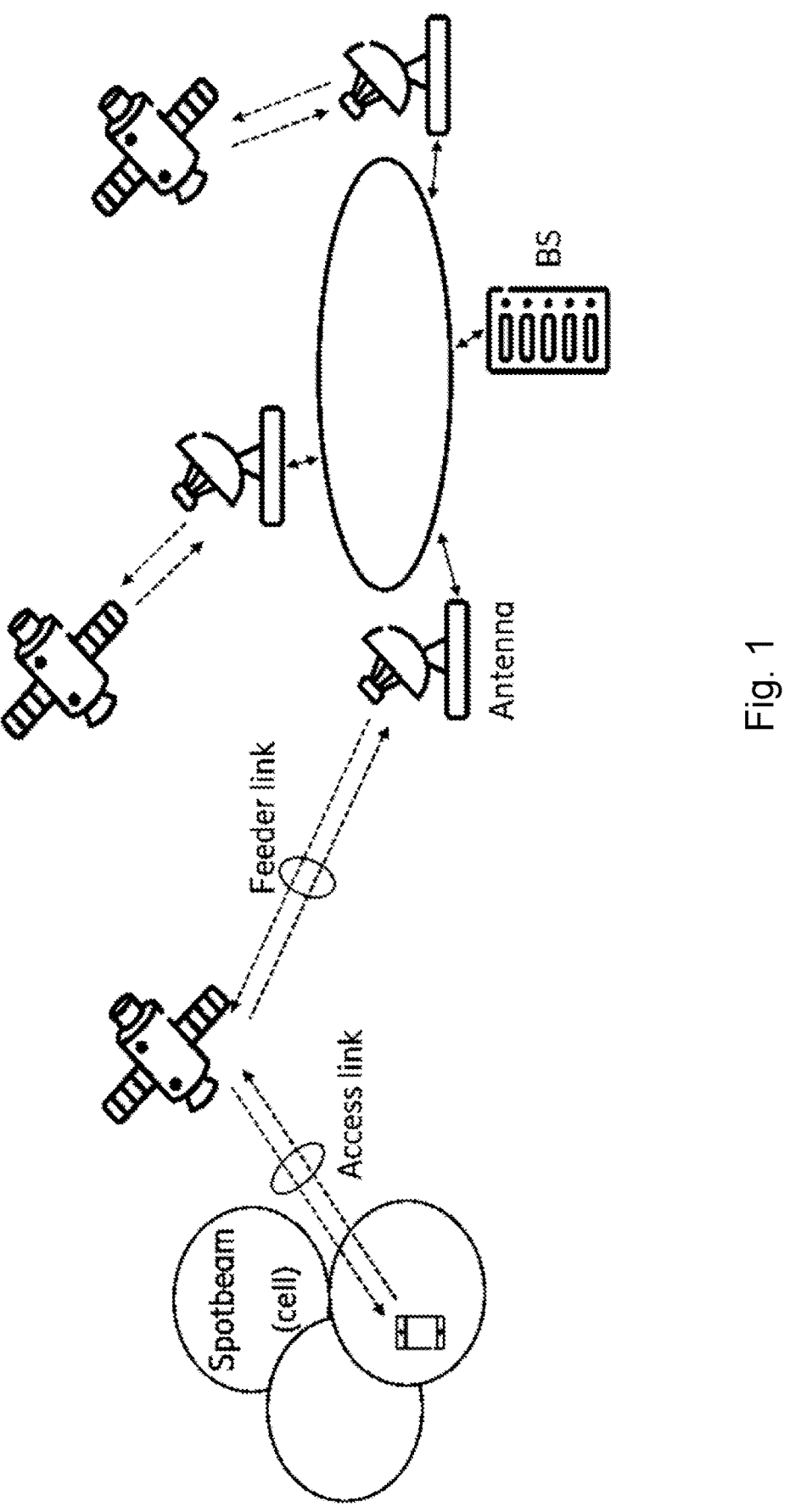
FIG. 1 is a block diagram illustrating an example satellite network architecture with bent pipe transponders.

As described above, certain challenges currently exist with connection control for non-terrestrial networks (NTNs). For example, the current release and redirect message and framework are for terrestrial networks only and do account for NTN networks or the service continuity scenario between a terrestrial network (TN) and a NTN. Certain aspects of the present disclosure and their embodiments may provide solutions to these or other challenges. For example, particular embodiments facilitate movement of a UE between carrier frequencies or networks involving NTN using RRCRelease with redirection.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

To facilitate redirection of a UE, in some embodiments the specification of the RRCRelease message is extended with optional information informing the UE that the UE is redirected to the carrier frequency of an NTN, possibly accompanied with additional information about the concerned NTN that facilitates UE access to the NTN. In some embodiments, the information in the RRCRelease message may be provided by adding a new radio access technology (RAT) type to RedirectedCarrierInfo, e.g., ntn, similar to nr or eutra and the corresponding element parameter, i.e., RedirectedCarrierInfoNTN or CarrierInfoNTN (or Redirect-CarrierInfoNR-NTN or CarrierInfoNR-NTN and possibly RedirectCarrierInfo-EUTRA-NTN for NTNs operating NR/NG-RAN and LTE/EUTRA respectively), may include information on carrier frequency, e.g., ntnFrequency, SMTC, subcarrier spacing, core network type, e.g., cnType, possibly NTN RAT (such as NR/NG-RAN or LTE/EU-TRAN), etc.

In some embodiments, the information is provided in the existing CarrierInfoNR IE. In some embodiments, the RRCRelease message may contain further information facilitating UE access to the NTN for which it is redirected, e.g., in the CarrierInfoNR IE or a new RedirectedCarrier-Info-NTN/CarrierInfoNTN/RedirectCarrierInfoNR-NTN/CarrierInfoNR-NTN IE (note that even though all these (and more) names of a new IE related to redirection to NTN are possible, for convenience, they may not all be repeated in all places where such IE names occur herein).

Such information may contain ephemeris data, including spatial and time related information about the satellite orbits of the NTN (e.g., in a new IE EphemerisInfo), making it easier for the UE to direct its receive and/or transmit antenna towards a satellite or calculate timing advance (TA) and Doppler shift frequency corrections. The existence of the IE, that would only be present in case of redirection to NTN, may serve as an implicit indication of redirection to an NTN. The UE may also use the ephemeris data to estimate the Doppler shift experienced with regards to transmissions/receptions to and from the satellite (or other NTN platform). As an option, the NTN or redirection related information provided in the RRCRelease message may include an explicit indication of the Doppler shift the UE can assume in the communication with the network for which the UE is redirected.

The following ASN.1 definitions show the existing signalling structure for reference:

```
RedirectCarrierInfo ::=        CHOICE {
    nr                             CarrierInfoNR,
    eutra                          RedirectedCarrierInfo-EUTRA,
    ...
}
RedirectedCarrierInfo-EUTRA ::=  SEQUENCE {
    eutraFrequency                   ARFCN-ValueEUTRA,
    cnType                           ENUMERATED {epc, fiveGC}
OPTIONAL    -- Need N
}
CarrierInfoNR ::=              SEQUENCE {
    carrierFreq                      ARFCN-ValueNR,
    ssbSubcarrierSpacing             SubcarrierSpacing,
    smtc                             SSB-MTC
OPTIONAL,    -- Need S
    ...
}
```

In some embodiments, the information provided as part of the RRCRelease message comprises a NTN cell whose ID (global cell ID and/or physical cell ID) can be provided implicitly or, e.g., in RedirectedCarrierInfo-NTN (or within CarrierInfoNR). Such a cell specific redirection may be mandatory for the UE to follow, or it could be realized as a cell specific offset (i.e., an offset in terms of dB of measured cell quality, such as reference signal received power (RSRP) or reference signal receive quality (RSRQ)) favoring the concerned cell in the cell ranking and cell selection that the UE performs. The cell indication may be provided in addition to an indication of a carrier the UE should move to or the cell indication may be an implicit indication to the UE to move to the carrier frequency of the indicated cell.

In some embodiments, the information provided as part of the RRCRelease message comprises the type of NTN, such as LEO, MEO, GEO, HIBS or HAPS, or the type of architecture, such as bent pipe or regenerative architecture. HAPS and HIBS are not satellite networks per se, although they classify as NTNs. HAPS can readily be included in the redirection to NTN information (i.e., the redirection to NTN information can be applied to HAPS) in accordance with any of the above described embodiments. This is also possible for HIBS, but for RIBS some embodiments include the related redirection information in existing carrier (redirection) information elements, such as the CarrierInfoNR IE.

According to the 3GPP release 15 specifications, in the RRCRelease message, the network can indicate to the UE to deprioritize (with the deprioritisationReq IE) the current carrier frequency or the current RAT (e.g., NR) (with the deprioritisationType parameter the deprioritisationReq IE) for a certain time (with the deprioritisationTimer parameter the deprioritisationReq IE). This parameter structure may be extended with indication possibilities that are relevant in the context of NTN.

In some embodiments, the value range of the ENUMERATED type deprioritisationType parameter (currently "frequency" or "nr") is extended with further possible values, such as "tn", meaning that the UE should deprioritize terrestrial networks in favor of non-terrestrial networks, or "ntn", meaning that the UE should deprioritize non-terrestrial networks in favor of terrestrial networks (where the latter is likely used when the RRCRelease message is sent by a NTN). Further indication possibilities in terms of values of the deprioritisationType parameter may include different types of NTN, such as "leo", "meo", "geo", "haps" or "hibs", respectively meaning that the UE should deprioritize LEO, MEO, GEO, HAPS or HIBS networks or that the UE should deprioritize a certain NTN architecture (i.e., a network using the concerned architecture), such as deprioritization of NTNs using the bent pipe architecture or deprioritization of NTNs using the regenerative architecture.

As a further extension, some embodiments include multiple deprioritisationType parameters, such as a sequence of such parameters or parameter values or a list of deprioritisationType values/indications, to indicate that the UE should deprioritize a certain combination of indicated types, e.g., deprioritization of NTNs operating LTE/EUTRA or deprioritization of LEO NTNs using the bent pipe architecture.

The currently specified deprioritisationReq IE is defined such that it can only instruct the UE to deprioritize a property associated with the current cell (i.e., the cell in which the UE receives the RRCRelease message), such as the cell's carrier frequency or the RAT (e.g., NR) of the cell. In some embodiments, this is extended to enable deprioritization of properties/aspects not associated with the current cell. When the aspect to deprioritize is a carrier frequency, this could to some extent be seen as providing temporary (time-limited) carrier frequency priorities, which temporarily overrides the regular carrier frequency priorities, i.e., the ones provided in the system information or (overriding the ones in the system information when in conflict) in the RRCRelease message. Such deprioritization could concern any of the previously described deprioritization "objects", such as the carrier frequency, RAT, TN/NTN, type of NTN, etc., not associated with the current cell. For instance, in an RRCRelease message sent in a TN cell, the network could indicate temporary deprioritization of NTNs.

In some embodiments, no explicit NTN (or TN/NTN) indication is introduced in the redirection related information in the RRCRelease message, but the carrier frequency the UE is redirected to implicitly informs the UE that it is being redirected to an NTN (i.e., the UE has a priori information about certain carrier frequencies, or frequency ranges, being used for NTN). Optionally, this may be combined with the inclusion of any of the other above described NTN or redirection related information. In a variation of this embodiment, an explicit NTN (or TN/NTN) indication is included when the UE is redirected to a HIBS network (since HIBS networks operate on international mobile telecommunications (IMT) frequencies, i.e., frequencies that might be used for TNs as well), but not for other NTN types, which operate on satellite communication frequencies.

The embodiments and examples above have been described mainly with scenarios where a UE is redirected from a TN to a NTN. However, particular embodiments are applicable also in the opposite scenario and may also be further generalized to any redirection case—at least redirection cases involving a NTN in one way or the other, e.g., redirection between NTNs. Thus, a TN/NTN indication in the RRCRelease message (as has been discussed in the context of preceding embodiments) may be used also when a UE is redirected from a NTN.

For example, the indication could indicate either "TN", for a UE being redirected from a NTN to a TN, or "NTN", for a UE being redirected from one NTN to another, e.g. from one NTN carrier frequency to another and/or from NTN of one type, such as LEO, to another type, such as GEO. As one option, if the UE is being redirected from a NTN and the TN/NTN indication is absent, then it means that the UE is being redirected to another NTN (i.e., the same network type is default). The indication of TN may further include public land mobile network (PLMN) ID. It could further include a time stamp when UE is allowed to search/consider NTN cells for camping. As another option, if the UE is being redirected from a NTN and the TN/NTN indication, or NTN type (e.g., LEO, MEO, GEO, HAPS, HIBS) is absent, then it means that the UE is being redirected to TN (i.e., TN is default). Similarly, if an (optional) indication of NTN type (e.g., LEO, MEO, GEO, HAPS, HIBS) is introduced in the RRCRelease message, then absence of such an indication could mean that the NTN the UE is redirected to is a NTN of the same type as the one indicating the redirection.

The embodiments described above are to some extent described to be applicable also for NTNs operating LTE/EUTRA, e.g., when the RedirectCarrierInfo-EUTRA IE is mentioned. Other aspects of the solution may easily be adapted to be applicable to LTE, e.g., most of the NTN or redirection related information may be applicable also when the NTN is operating LTE/EU IRA. Another adaptation of the solution would be that the RRCRelease message may be replaced by the RRCConnectionRelease message defined for LTE/EUTRA.

Figure 2:
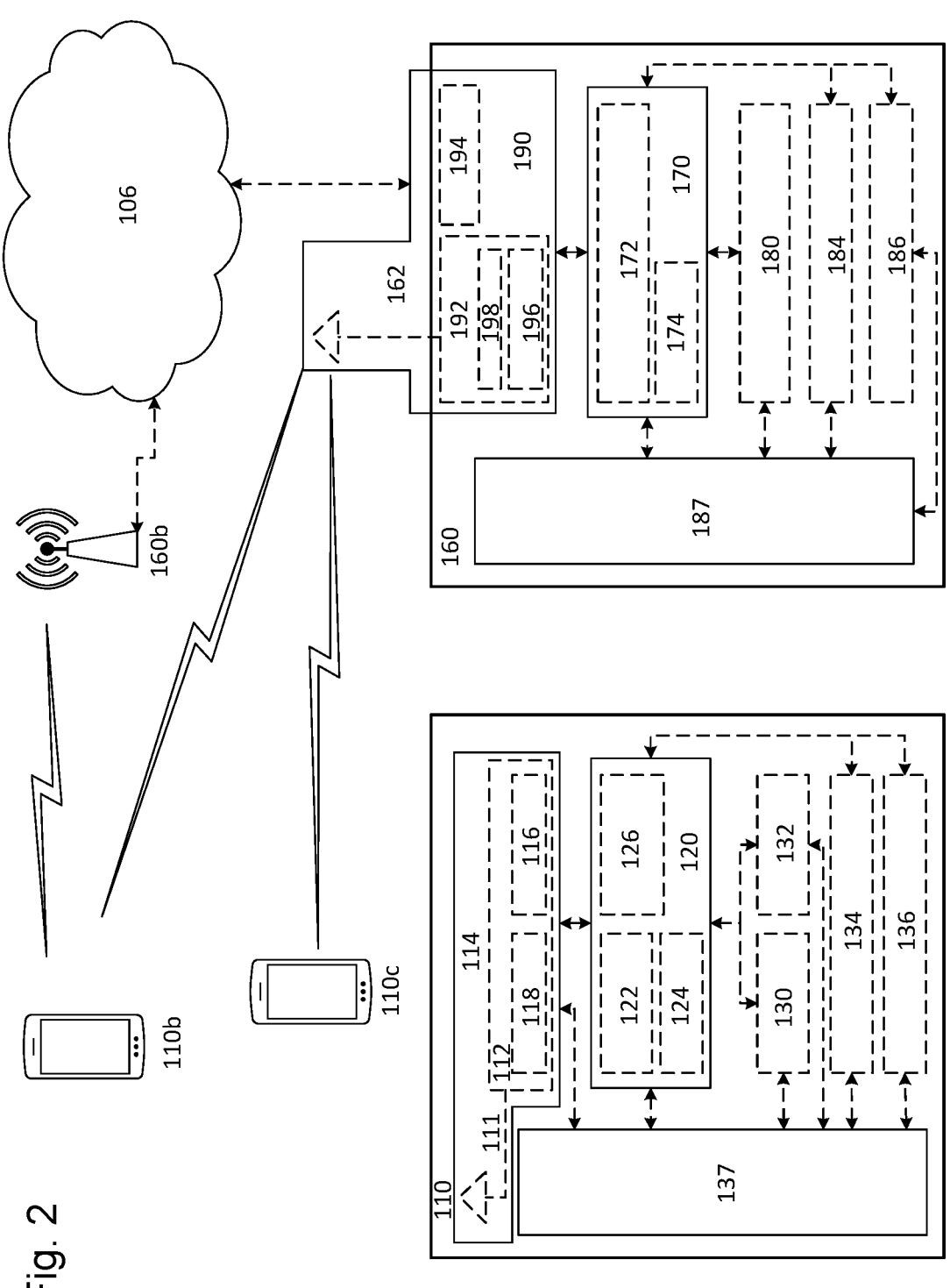
FIG. 2 is a block diagram illustrating an example wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicleto-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 3:
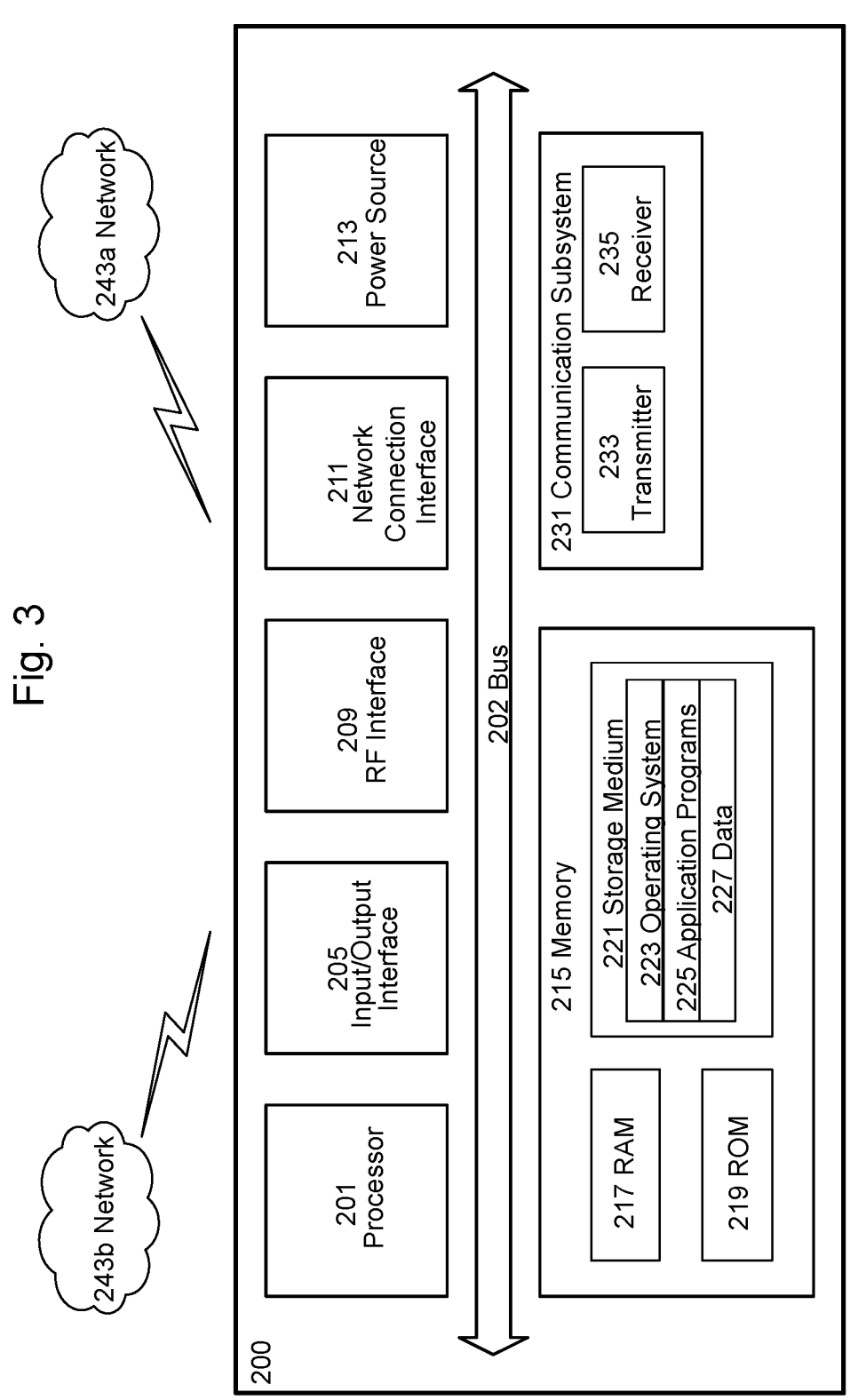
FIG. 3 illustrates an example user equipment, according to certain embodiments.

FIG. 3 illustrates an example user equipment, according to certain embodiments.

As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3" Generation Partnership Project (3GPP), including a NB-IoT UE, a machine type communication (MTC) UE, and/or an enhanced MTC (eMTC) UE. UE 200, as illustrated in FIG. 3, is one example of a WD configured for communication in accordance with one or more communication standards promulgated by the 3' Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 3, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 4:
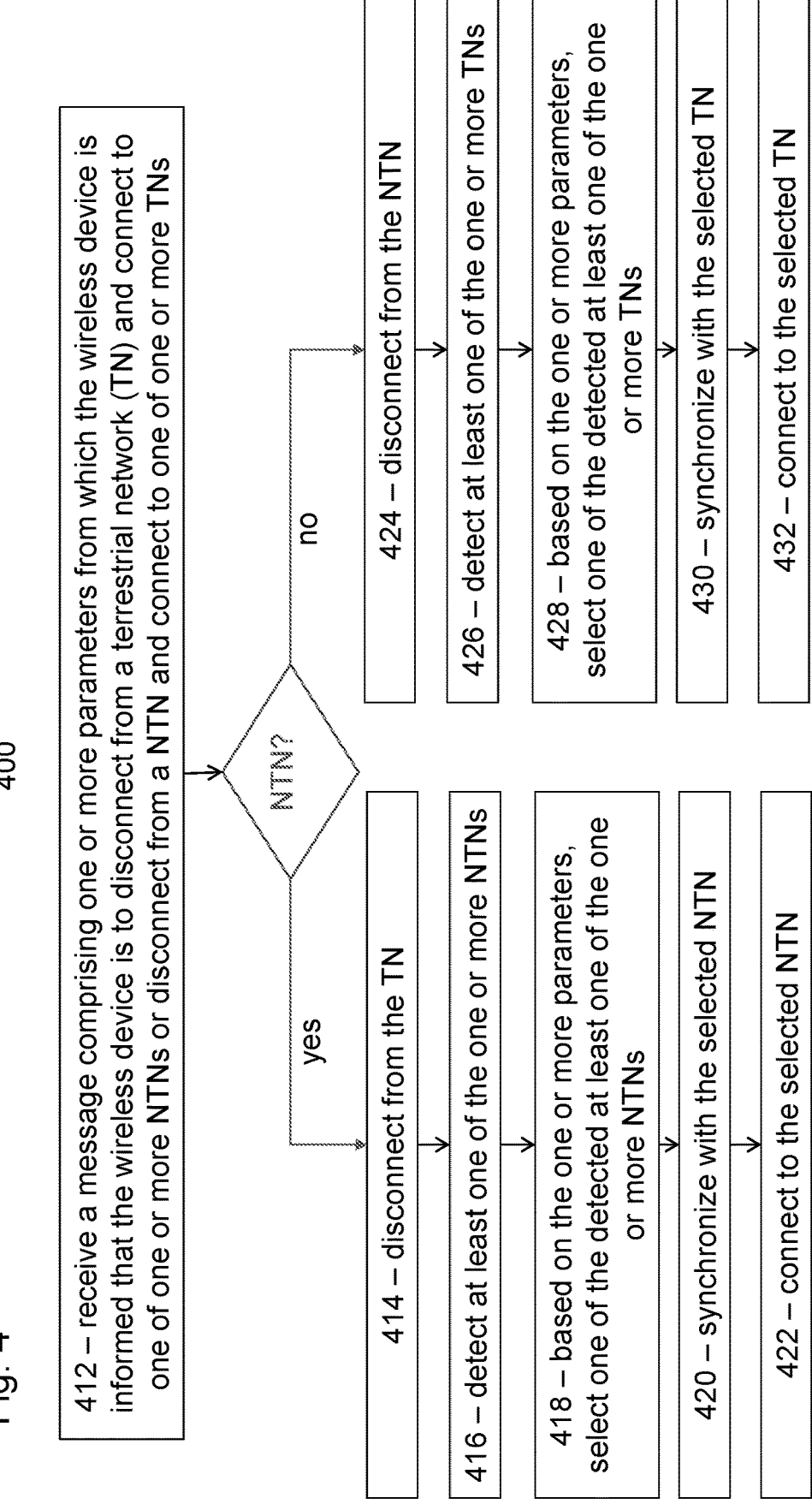
FIG. 4 is flowchart illustrating an example method in a wireless device, according to certain embodiments.

FIG. 4 is a flowchart illustrating an example method in a wireless device, according to certain embodiments. In particular embodiments, one or more steps of FIG. 4 may be performed by wireless device 110 described with respect to FIG. 2. The wireless device is operable to perform NTN connection control.

The method begins at step 412, where the network node (e.g., network node 160) receives a message comprising one or more parameters from which the wireless device is informed that the wireless device is to disconnect from a TN and connect to one of one or more NTNs or disconnect from a NTN and connect to one of one or more TNs.

In particular embodiments, the message is an RRCRelease message. The one or more parameters may comprise a carrier frequency of the NTN, a RAT type associated with the NTN, and/or one or more of synchronization signal block measurement timing configuration (SMTC), subcarrier spacing, core network type, cell identifier, and type of NTN (e.g., low, medium, or high earth orbit, etc.).

In particular embodiments, the one or more parameters comprise information to facilitate the wireless device finding and/or connecting with a satellite associated with the NTN (e.g., ephemeris data, information about a feeder link, location of a gateway on the ground, information about coverage (e.g. estimated cell area), etc.

In particular embodiments, the one or more parameters comprise prioritization information associated with the NTN. The prioritization information may comprise an offset to apply to one or more cell quality values and/or a deprioritisationType. The prioritization information may comprise a list. The prioritization information may be associated with a cell different than the current cell.

In particular embodiments, the one or more parameters comprise any parameters described with respect to the embodiments and/or examples described herein.

In particular embodiments, the one or more parameters are part of RedirectedCarrierInfo information element, CarrierInfoNR information element and/or a new information element.

Upon the one or more parameters informing the wireless device to connect to one of one or more NTNs, at step 414 the wireless device disconnects from the TN and at step 416 detects at least one of the one or more NTNs.

At step 418, based at least in part on the one or more parameters, the wireless device selects one of the detected at least one of the one or more NTNs and synchronizes with the selected NTN using at least one of the one or more parameters to facilitate the synchronization at step 420. At step 422, the wireless device connects to the selected NTN.

Upon the one or more parameters informing the wireless device to connect to one of one or more TNs, at step 424 the wireless device disconnects from the NTN and detects at least one of the one or more TNs at step 426.

At step 428, based at least in part on the one or more parameters, the wireless device selects one of the detected at least one of the one or more TNs and synchronizes with the selected TN using at least one of the one or more parameters to facilitate the synchronization at step 430. At step 432, the wireless device connects to the selected TN.

Modifications, additions, or omissions may be made to method 400 of FIG. 4. Additionally, one or more steps in the method of FIG. 4 may be performed in parallel or in any suitable order. For example, the wireless device may wait to disconnect from a network until the wireless device has successfully detected and selected the new network.

Figure 5:
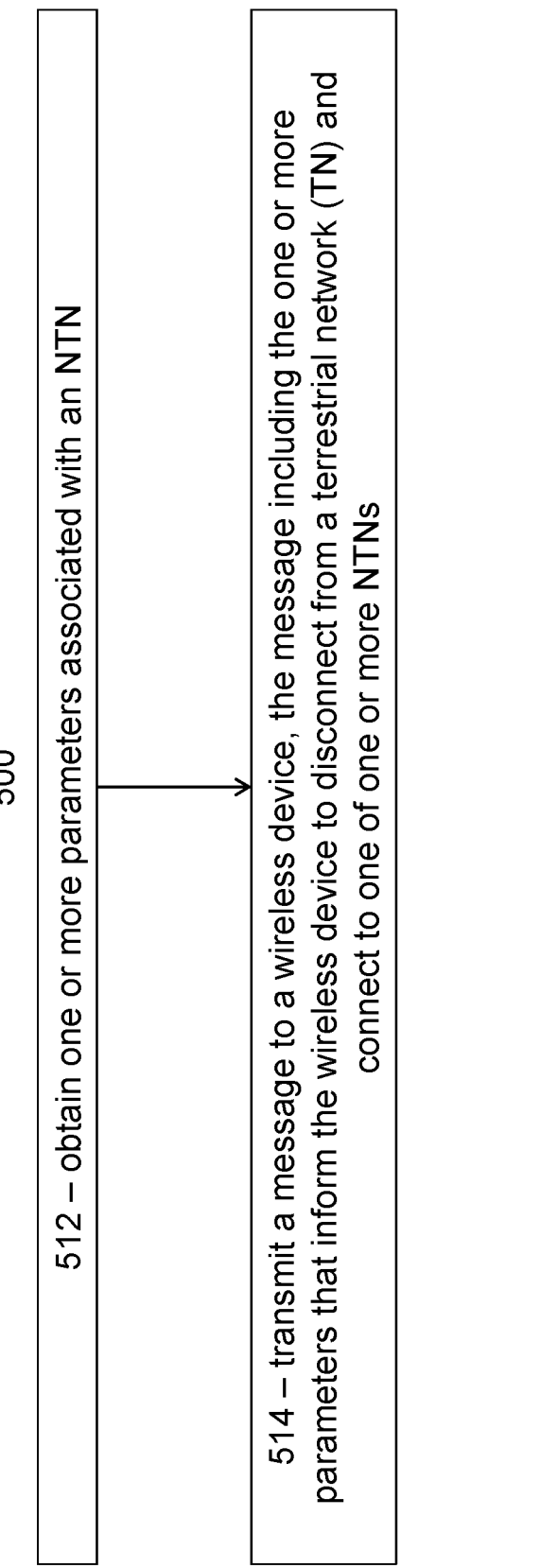
FIG. 5 is flowchart illustrating an example method in a network node, according to certain embodiments.

FIG. 5 is a flowchart illustrating an example method in a network node, according to certain embodiments. In particular embodiments, one or more steps of FIG. 5 may be performed by network node 160 described with respect to FIG. 2. The network node is operable to perform NTN connection control.

The method begins at step 512, where the network node (e.g., network node 160) obtains one or more parameters associated with an NTN and at step 514, transmits a message to a wireless device. The message includes one or more parameters that inform the wireless device to disconnect from a terrestrial network (TN) and connect to one of one or more NTNs.

In particular embodiments, the message and the one or more parameters are the same as those described with respect to the wireless device embodiments.

Modifications, additions, or omissions may be made to method 500 of FIG. 5. Additionally, one or more steps in the method of FIG. 5 may be performed in parallel or in any suitable order.

Figure 6:
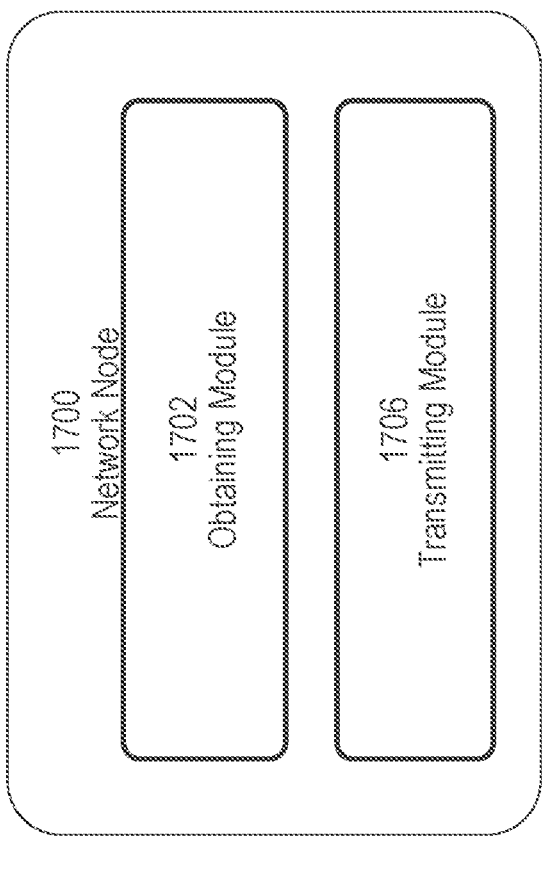
FIG. 6 illustrates a schematic block diagram of a wireless device and a network node in a wireless network, according to certain embodiments.

FIG. 6 illustrates a schematic block diagram of two apparatuses in a wireless network (for example, the wireless network illustrated in FIG. 2). The apparatuses include a wireless device and a network node (e.g., wireless device 110 and network node 160 illustrated in FIG. 2). Apparatuses 1600 and 1700 are operable to carry out the example methods described with reference to FIGS. 4 and 5, respectively, and possibly any other processes or methods disclosed herein. It is also to be understood that the methods of FIGS. 4 and 5 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause obtaining module 1702, transmitting module 1706, and any other suitable units of apparatus 1700 to perform corresponding functions according one or more embodiments of the present disclosure.

As illustrated in FIG. 6, apparatus 1600 includes receiving module 1602 configured to receive control and signaling information, such as handover messages and configuration messages, according to any of the embodiments and examples described herein. Determining module 1604 is configured to determine which network the apparatus should switch to according to any of the embodiments and examples described herein. Transmitting module 1606 is configured to transmit control and signaling information, such as handover messages and configuration messages, according to any of the embodiments and examples described herein.

As illustrated in FIG. 6, apparatus 1700 includes obtaining module 1702 configured to obtain one or more parameters associated with an NTN according to any of the embodiments and examples described herein. Transmitting module 1706 is configured to transmit a message to a wireless device, the message including the one or more parameters that inform the wireless device to disconnect from a TN and connect to one of one or more NTNs, according to any of the embodiments and examples described herein.

Figure 7:
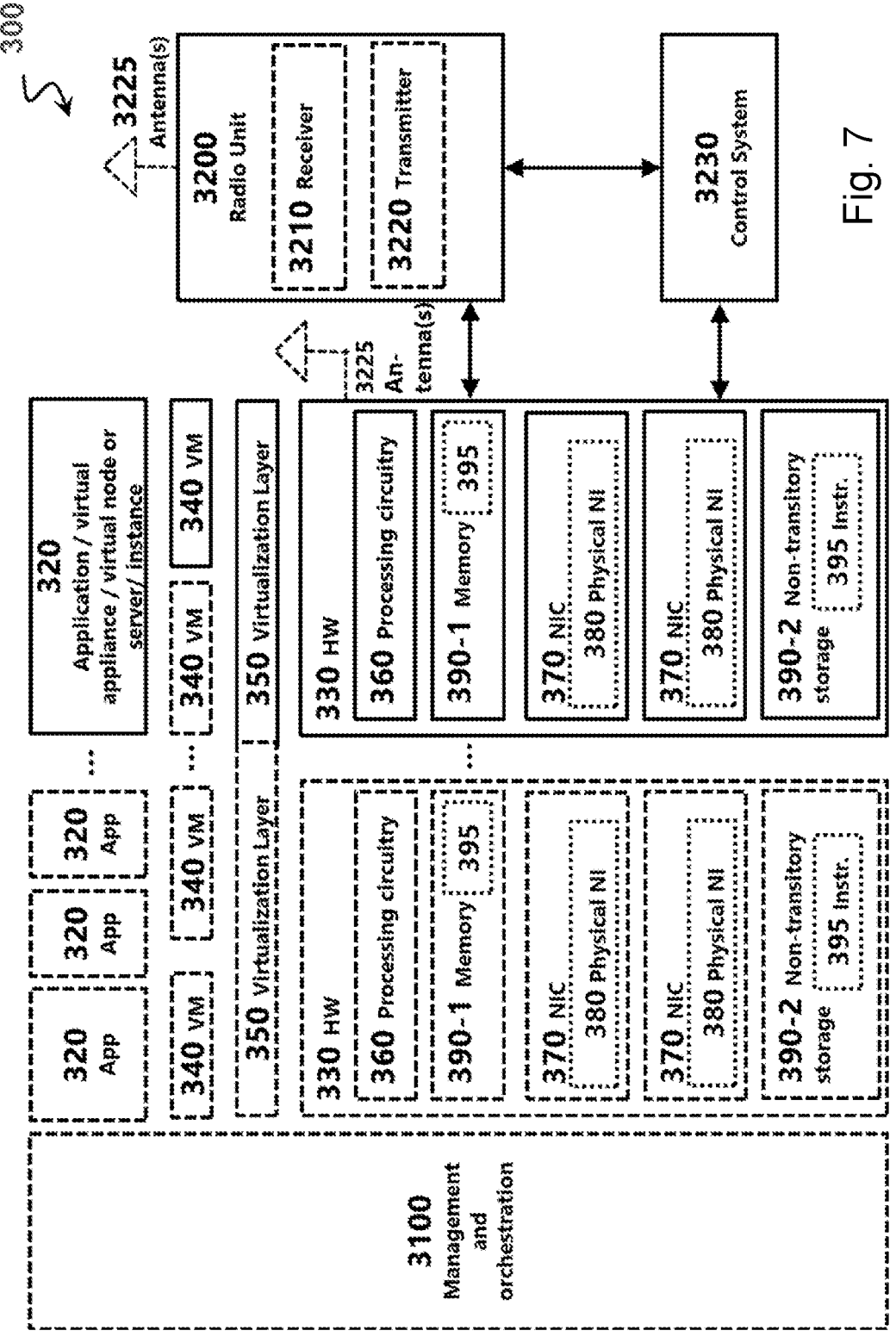
FIG. 7 illustrates an example virtualization environment, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 8:
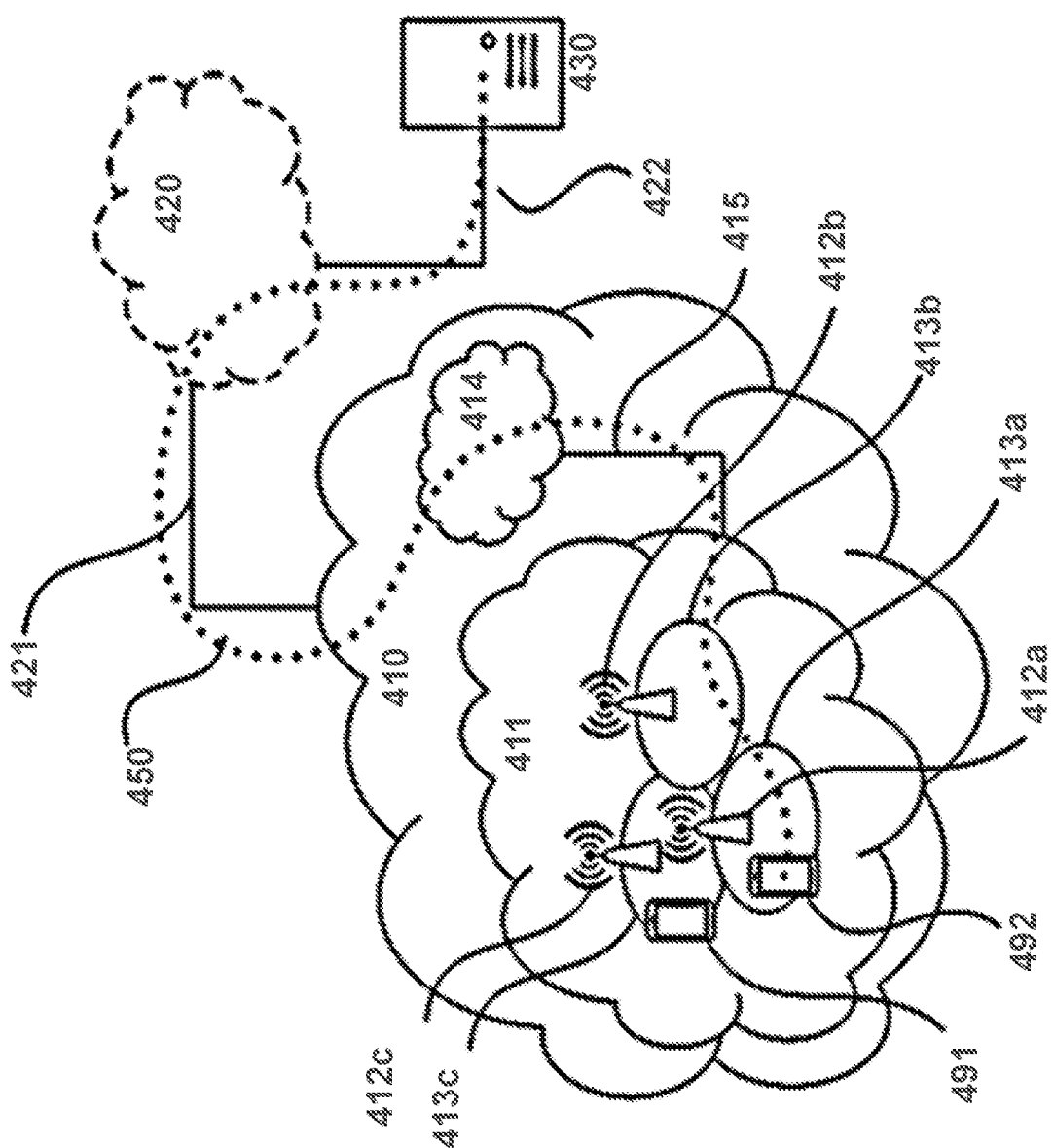
FIG. 8 illustrates an example telecommunication network connected via an intermediate network to a host computer, according to certain embodiments.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 9:
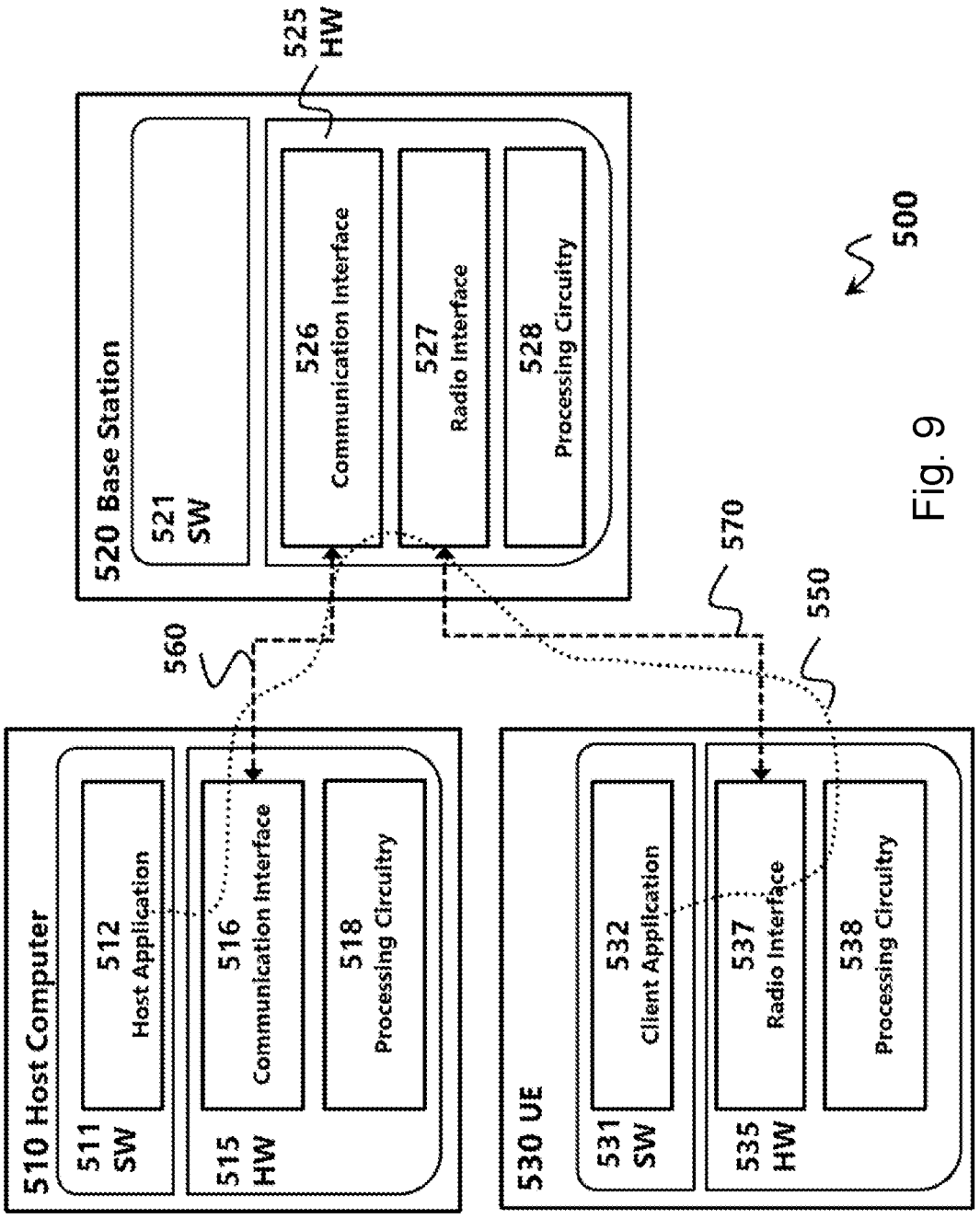
FIG. 9 illustrates an example host computer communicating via a base station with a user equipment over a partially wireless connection, according to certain embodiments.

FIG. 9 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct, or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 9 may be similar or identical to host computer 430, one of base stations 412*a*, 412*b*, 412*c* and one of UEs 491, 492 of FIG. 7, respectively. This is to say, the inner workings of these entities may be as shown in FIG. 9 and independently, the surrounding network topology may be that of FIG. 7.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 10:
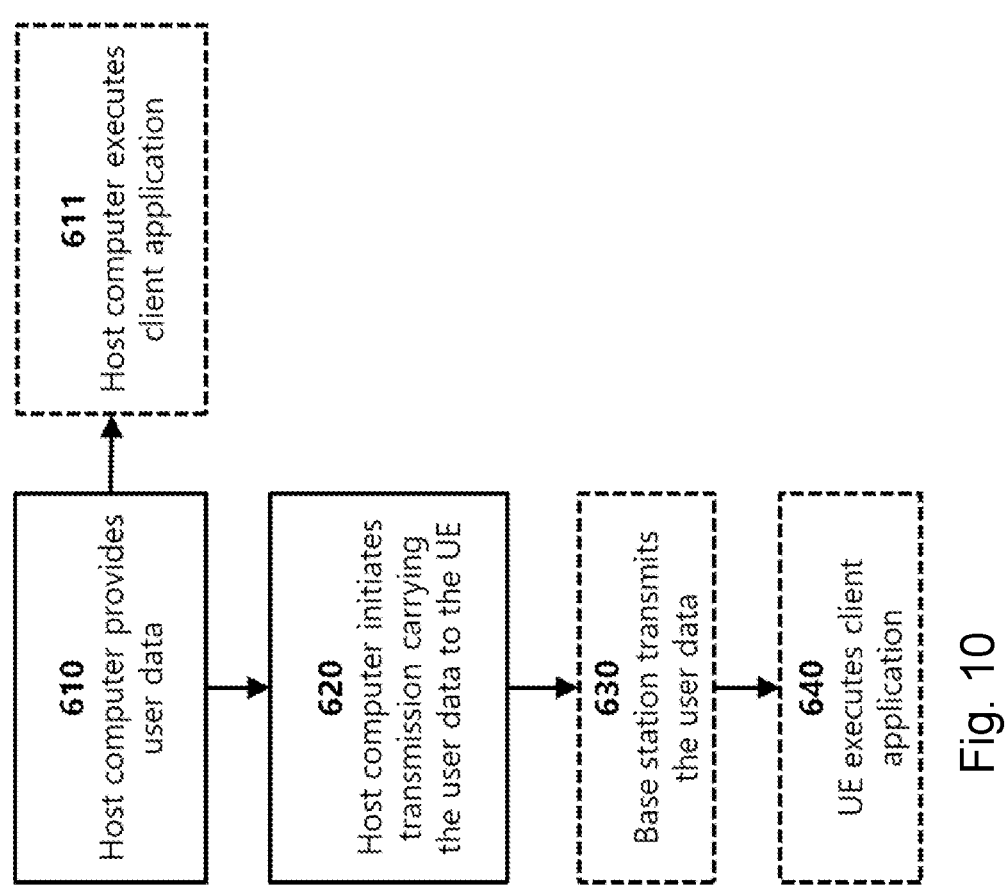
FIG. 10 is a flowchart illustrating a method implemented, according to certain embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 11:
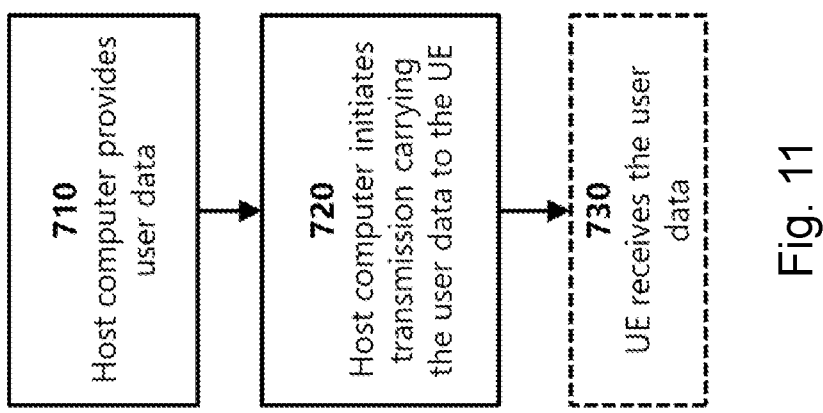
FIG. 11 is a flowchart illustrating a method implemented in a communication system, according to certain embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided
   by the power density in the
band
CQI Channel Quality information
C-RNTI Cell RNTI
CSI Channel State Information
CSI-RS CSI Reference Signal
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GEO Geostationary Orbit
GERAN GSM EDGE Radio Access Network
gNB Base station in NR
GNSS Global Navigation Satellite System
p GPS Global Positioning System
GSM Global System for Mobile communication
HARQ Hybrid Automatic Repeat Request
HO Handover
HSPA High Speed Packet Access
HRPD High Rate Packet Data
LEO Low Earth Orbit
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single
   Frequency Network
MBSFN ABS MBSFN Almost Blank Subframe
MDT Minimization of Drive Tests MEO Medium Earth Orbit
MIB Master Information Block
MME Mobility Management Entity
MSC Mobile Switching Center
NGSO Non-Geostationary Orbit
NPDCCH Narrowband Physical Downlink Control Channel
NR New Radio
NTN Non-Terrestrial Networks
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
p PRACH Physical Random Access Channel
PRS Positioning Reference Signal
PSS Primary Synchronization Signal
PUCCH Physical Uplink Control Channel
PUSCH Physical Uplink Shared Channel
RA Random Access
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RS SI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for non-terrestrial network (NTN) connection control, the method comprising:
   receiving a message comprising one or more parameters from which the wireless device is informed that the wireless device is to disconnect from a terrestrial network (TN) and connect to one of one or more NTNs or disconnect from a NTN and connect to one of one or more TNs;
   upon the one or more parameters informing the wireless device to connect to one of one or more NTNs:
   disconnecting from the TN;
   detecting at least one of the one or more NTNs;
   based at least in part on the one or more parameters, selecting one of the detected at least one of the one or more NTNs;
   synchronizing with the selected NTN using at least one of the one or more parameters to facilitate the synchronization;
   connecting to the selected NTN;
   upon the one or more parameters informing the wireless device to connect to one of one or more TNs:
   disconnecting from the NTN;
   detecting at least one of the one or more TNs;
   based at least in part on the one or more parameters, selecting one of the detected at least one of the one or more TNs;
   synchronizing with the selected TN using at least one of the one or more parameters to facilitate the synchronization; and
   connecting to the selected TN.

2. The method of claim 1, wherein the one or more parameters comprise a carrier frequency of the NTN.

3. The method of claim 1, wherein the one or more parameters comprise a radio access technology (RAT) type associated with the NTN.

4. The method of claim 1, wherein the one or more parameters comprise one or more of synchronization signal block measurement timing configuration (SMTC), subcarrier spacing, core network type, cell identifier, and type of NTN.

5. The method of claim 1, wherein the one or more parameters are part of RedirectedCarrierInfo information element or CarrierInfoNR information element.

6. The method of claim 1, wherein the one or more parameters comprise prioritization information associated with the NTN.

7. The method of claim 6, wherein the prioritization information comprises an offset to apply to one or more cell quality values.

8. The method of claim 6, wherein the prioritization information comprises deprioritisationType.

9. The method of claim 6, wherein the prioritization information is associated with a cell different than the current cell.

10. A wireless device operable to perform non-terrestrial network (NTN) connection control, the wireless device comprising processing circuitry operable to:

receive a message comprising one or more parameters from which the wireless device is informed that the wireless device is to disconnect from a terrestrial network (TN) and connect to one of one or more NTNs or disconnect from a NTN and connect to one of one or more TNs;

upon the one or more parameters informing the wireless device to connect to one of one or more NTNs:

disconnect from the TN;

detect at least one of the one or more NTNs;

based at least in part on the one or more parameters, select one of the detected at least one of the one or more NTNs;

synchronize with the selected NTN using at least one of the one or more parameters to facilitate the synchronization;

connect to the selected NTN;

upon the one or more parameters informing the wireless device to connect to one of one or more TNs:

disconnect from the NTN;

detect at least one of the one or more TNs;

based at least in part on the one or more parameters, select one of the detected at least one of the one or more TNs;

synchronize with the selected NTN using at least one of the one or more parameters to facilitate the synchronization; and connect to the selected NTN.

11. The wireless device of claim 10, wherein the one or more parameters comprise a carrier frequency of the NTN.

12. The wireless device of claim 10, wherein the one or more parameters comprise a radio access technology (RAT) type associated with the NTN.

13. The wireless device of claim 10, wherein the one or more parameters comprise one or more of synchronization signal block measurement timing configuration (SMTC), subcarrier spacing, core network type, cell identifier, and type of NTN.

14. The wireless device of claim 10, wherein the one or more parameters are part of RedirectedCarrierInfo information element or CarrierInfoNR information element.

15. The wireless device of claim 10, wherein the one or more parameters comprise prioritization information associated with the NTN.

16. The wireless device of claim 15, wherein the prioritization information comprises an offset to apply to one or more cell quality values.

17. The wireless device of claim 15, wherein the prioritization information comprises deprioritisationType.

18. The wireless device of claim 15, wherein the prioritization information is associated with a cell different than the current cell.

* * * * *